United States Patent [19]

Mikami

[11] Patent Number: 4,683,250
[45] Date of Patent: Jul. 28, 1987

[54] ROOM-TEMPERATURE-CURABLE SILICON-MODIFIED POLYETHER COMPOSITION

[75] Inventor: Ryuzo Mikami, Midland, Mich.

[73] Assignee: Toray Silicone Co., Ltd., Tokyo, Japan

[21] Appl. No.: 935,885

[22] Filed: Nov. 28, 1986

[30] Foreign Application Priority Data

Dec. 27, 1985 [JP] Japan ................................. 60-295339

[51] Int. Cl.$^4$ ................................................ C08F 2/46
[52] U.S. Cl. ........................................ 522/33; 522/48; 522/39; 522/68; 522/66; 522/104; 522/83; 522/172; 524/315; 524/318
[58] Field of Search ................. 522/104, 148, 172, 83, 522/33, 48, 39, 68, 66; 524/315, 318

[56] References Cited

U.S. PATENT DOCUMENTS 4,322,272  3/1982  Mita et al. .................... 204/159.13

FOREIGN PATENT DOCUMENTS 21453  2/1980  Japan .

Primary Examiner—Melvyn I. Marquis
Attorney, Agent, or Firm—Roger H. Borrousch

[57] ABSTRACT

Room temperature-curable composition made from a silicone-modified polyether containing silyl end groups having hydrolyzable groups and ester provide a cured silicone product which does not have a tacky surface. Adding a sensitizer to the composition increases the reliability of the surface to be void of tack. These compositions have less dirt pickup.

6 Claims, No Drawings

ROOM-TEMPERATURE-CURABLE SILICON-MODIFIED POLYETHER COMPOSITION

BACKGROUND OF THE INVENTION

Field of the Invention

The present invention relates to a room temperature-curable composition. More specifically, the present invention relates to a room temperature-curable composition which is principally composed of silicone-modified polyether and which provides an improved cured product with a tack-free surface.

Background Information

Prior Art

Room temperature-curable compositions which are principally composed of silicone-modified polyether are inexpensive and have relatively satisfactory properties, and so have been used as hermetic sealing agents and sealants. However, when such room temperature-curable compositions are used in these applications, the serious problem arises that the surface of the cured material remains tacky. This remaining surface tack results in the adhesion of dust, soil, or sand and, consequently, the external appearance of the cured material undesirably deteriorates.

Various methods directed at eliminating this drawback have been proposed. For example, Japanese patent application Laid-Open No. 55-21453, [80-21453], published Feb. 15, 1980, to Kanegafuchi Chem KK. proposes a method for eliminating surface tack in the cured material by mixing a hydrolyzable group-possessing organosilicon polymer into the silicone-modified polyether. U.S. Pat. No. 4,322,272. issued Mar. 30, 1982. describes a method for eliminating surface tack in the cured material by adding a photocurable substance to silicone-modified organic polymer (including silicone-modified polyether).

Problems to be Solved by the Invention

However, the preceding methods suffer from the problem that the high cost of the organosilicon polymers and photocurable substances reduces the advantage accruing to the use of inexpensive silicone-modified polyether compositions by half. In addition, the preceding methods suffer from the additional problem that they do not satisfactorily eliminate surface tack in the cured material.

SUMMARY OF THE INVENTION

Various methods were examined by the present inventors in order to eliminate the drawbacks residing in the prior art and it was discovered that surface tack in the cured material can be eliminated by the blending of a specific and inexpensive additive.

Accordingly, the object of the present invention is to provide an inexpensive room temperature-curable composition whose cured material has a tack-free surface and which is principally composed of silicone-modified polyether.

The present invention relates to room temperature-curable composition comprising (A) 100 parts by weight of silicone-modified polyether having at its molecular chain terminals at least one unit of the formula

in which R represents a monovalent hydrocarbon group, X represents a hydrolyzable group and a is an integer with a value of 0 to 2, whose main chain is essentially composed of chemically bonded repeating units of the formula—R'O— in which R' represents a divalent alkylene group and whose molecular weight is from 500 to 15,000 and (B) 0.1 to 50 parts by weight of ester whose principal component is an ester of unsaturated higher fatty acid with alcohol, where the fatty acid has at least 10 carbon atoms in the molecule.

DESCRIPTION OF THE PREFERRED EMBODIMENTS

The silicone-modified polyether, (A), of the present invention is a polymer having at its molecular chain terminals at least one group of the formula

in which R is a monovalent hydrocarbon group such as alkyl groups, such as methyl, ethyl, propyl and octyl; alkenyl groups such as vinyl and allyl; aryl groups such as phenyl and tolyl; and halogenated hydrocarbon groups such as chloromethyl and 3,3,3-trifluoropropyl. X is a hydrolyzable group and a is an integer with a value of 0 to 2. The polyether of (A) can be, for example, polyethylene oxide-polypropylene oxide copolymers whose main chain is essentially composed of chemically bonded repeating units of the formula—R'O— where R' represents a divalent alkylene group and whose molecular weight is 500 to 15,000.

Examples of X, the silicon-bonded hydrolyzable groups, are acyloxy groups such as acetoxy, octanoyloxy, and benzoyloxy; ketoxime groups such as dimethyl ketoxime, methyl ethyl ketoxime, and diethyl ketoxime; alkoxy groups such as methoxy, ethoxy, and propoxy; alkenyloxy groups such as isopropenyloxy and 1-ethyl-2-methylvinyloxy; amino groups such as dimethylamino, diethylamino, butylamino, and cyclohexylamino; aminoxy groups such as dimethylaminoxy and diethylaminoxy; and amide groups such as N-methylacetamide, N-ethylacetamide, and N-methylbenzamide. Among these compounds, alkoxy groups are particularly preferred.

As described in Japanese patent application Laid-Open No. 50-156599 [80-156599], published Dec. 17, 1975, the aforementioned silicone-modified polyethers can be produced by an addition reaction between an oxyalkylene polymer with terminal aliphatically unsaturated groups, and a hydrosilicon compound with silicon-bonded hydrolyzable groups.

When the silicone-modified polyether is to be used to produce a rubbery elastomer by the formation of a three-dimensional network structure at ambient atmosphere by exposure to moisture, the number of silicon-bonded hydrolyzable groups, that is, the number of X groups per terminal end, is preferably 2 or 3. When the silicone-modified polyether has one X group, it is preferably blended with a silicone-modified polyether with 2 or 3 X groups.

The curing rate of the silicone-modified polyether will vary with atmospheric temperature, relative humidity, type of catalyst, and type of hydrolyzable group. In particular, the nature of the hydrolyzable group significantly affects the curing rate of the silicone-modified polyether. Due to this, the presence or absence of a catalyst and the type of catalyst to be used must be given full consideration in practical applications.

The (B) component of the present invention is ester principally composed of an ester of an unsaturated higher fatty acid with an alcohol. The ester has the significant effect of eliminating the surface tack of the present composition after curing.

The unsaturated higher fatty acids used in component (B) are to have at least 10 carbons in the molecule. With regard to the number of unsaturated groups and carboxyl groups present, 1 unsaturated group and 1 carboxyl group may be present, or 1 unsaturated group and 2 or more carboxyl groups may be present, or 2 or more unsaturated groups and 1 carboxyl group may be present, or two or more of each type of group may be present.

The unsaturated higher fatty acid ester which comprises the principal component of component (B), preferably comprises 100 wt. % or nearly 100 wt % of the total component (B), and it must comprise at least 80 wt %. Components which may be present other than said ester are unsaturated fatty acid esters in which the unsaturated fatty acid has less than 10 carbons, saturated fatty acid ester compounds, alcohols unsaturated fatty acids, and saturated fatty acids.

Examples of component (B) are the esters obtained by the condensation reaction between higher unsaturated fatty acids, such as oleic, linolenic, eleostearic, licanic, ricinoleic, and arachidonic acids, and alcohols selected from among monohydric alcohols such as methanol and ethanol, dihydric alcohols such as ethylene glycol, propylene glycol, and butylene glycol, trihydric alcohols such as trimethylolpropane, glycerol, and trimethylolethane, tetrahydric alcohols such as pentaerythritol, hexahydric alcohols such as sorbitol and organosilicon compounds having Si-bonded organic groups which bear a hydroxyl group.

Component (B) may be produced by the aforementioned condensation reaction between unsaturated higher fatty acid and alcohol, but components (B) which are most preferred for practical applications due to their low cost and convenience are those naturally occurring unsaturated fats and oils which are principally composed of triglyceryl esters, i.e., glycerol esters of unsaturated higher fatty acids, for example, linseed, tung, soybean, castor, dehydrated castor, fish, hempseed, cottonseed, and tall oils.

Component (B) is to be used in amounts of from 0.1 to 50 weight parts per 100 weight parts component (A). When component (B) is used in amounts of less than 0.1 weight parts, a satisfactory suppression of surface tack in the cured product will not be obtained. On the other hand, when this quantity exceeds 50 weight parts, the post-cure properties of the composition of the present invention will be significantly degraded.

The addition of component (b) will generally provide a satisfactory suppression of surface tack in the cured product, but the supplementary addition of a sensitizer has the effect of more reliably and rapidly eliminating the tack when this is desired.

Sensitizers known in the art may be used and examples are acetophenone, propiophenone, benzophenone, xanthone, fluorenone, benzaldehyde, fluorene, anthraquinone, triphenylamine, carbazole, 3-methylacetophenone 4-chlorobenzophenone, 4.4'-dimethoxybenzophenone and N,N,N',N'-tetramethyl-4,4'-diaminobenzophenone, and those sensitizers which are the reaction products of organosilane or organopolysiloxane with a sensitizer as described, for example, in Japanese patent publication No. 51-48794 [76-48794], published Apr. 27, 1976; and Japanese patent publication Laid-Open Nos. 54-44643 [79-44643], published Apr. 9, 1979, to Shinetsu Chemical Ind. K.K; Japanese patent publication No. 57-125204 [82-125204], published Aug. 4, 1982, to Toray Silicone KK; Japanese patent publication No. 57-131230 [82-131230], published Aug. 14, 1982, to Toray Silicone KK; and U.S. Pat. No. 4,391,963, issued July 5. 1983, to Akihiko Shirahata, assigned to Toray Silicone KK.

The sensitizer is to be used in amounts of from 0.0 to 20 weight parts per 100 weight parts component (A) for the following reasons. When too little is used, the effect of rapidly and thoroughly eliminating tack is absent. When this quantity is too large, the miscibility with component (A) is poor, thus degrading the properties of the cured material.

In addition to the above-mentioned components, optional components to be used encompass fillers, such as silica, calcium carbonate, carbon black, and talc; plasticizers such as phthalate esters, a typical example of which is dioctyl phthalate, and chlorinated paraffins; curing catalysts, for example, organotin compounds such as tin octylate and dibutyltin dilaurate, amines such as laurylamine and alkyl titanate esters; adhesion promoters; pigments such as titanium oxide and iron oxide red; aging inhibitors; ultraviolet absorbers; hydroxyl group-containing organopolysiloxanes; and hydrolyzable group-containing silicon compounds.

The room temperature-curable composition of the present invention is readily produced by kneading the aforementioned components with each other to homogeneity using a kneader mixer or paint roll, etc.

The composition of the present invention can be prepared as either the single-package or two-package composition.

To produce the single-package composition, said composition is mixed with the exclusion of moisture and then stored in a cartridge. To prepare the two-package composition, for example, the base substance and catalyst are inserted in one container and the crosslinking agent is stored in another container. The contents of the two containers are mixed at the time of application.

The following examples will illustrate the present invention but do not limit the present invention which is properly delineated in the appended claims. In the examples, "parts" are "parts by weight."

EXAMPLE 1

To 100 parts of silicone-modified polyoxypropylene with an average molecular weight of 8,500 and which had the

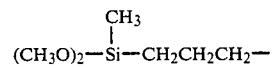

group at 80% of all polyoxypropylene terminals was added 3, 5, or 7 parts tung oil as shown in Table 1 as Sample 1, Sample 2, and Sample 3 respectively; 30 parts ditridecyl phthalate as plasticizer and 130 parts higher fatty acid-treated calcium carbonate powder as filler and the resulting mixture was thoroughly mixed to homogeneity using a mixer. One part tin octylate and 1 part laurylamine were added to this mixture and, after thorough mixing, the product was relatively thickly (1 to 2 mm) coated on a glass plate and then allowed to stand outdoors for 1 week. The same procedure was followed in the comparative example, except that the tung oil was not added and is designated Comparative Sample 1 in Table 1.

The surface tack was evaluated by touch after the sample had been cured by maintaining outdoors for one week. The results observed were as shown in Table 1. The present invention, which contains tung oil, was wholly tack-free in all cases while significant tack was observed in the comparative example, in which tung oil had not been added.

TABLE 1

| Sample | Quantity of Tung Oil (parts) | Surface Tack |
|---|---|---|
| Comparative Sample 1 | 0 | Significant |
| Sample 1 | 3 | Wholly Absent |
| Sample 2 | 5 | Wholly Absent |
| Sample 3 | 7 | Wholly Absent |

EXAMPLE 2

To 100 parts of the silicone-modified polyoxypropylene as described in Example 1 was added 4 parts (designated Sample 4) or 8 parts (designated Sample 5) linseed oil; 30 parts dioctyl phthalate as plasticizer, and 120 parts higher fatty acid-treated calcium carbonate powder as filler and the resulting mixture was mixed to homogeneity. One part tin octylate and 1 part laurylamine were added and, after thorough mixing, the product was relatively thickly coated on a glass plate and then allowed to stand outdoors for 1 week. After maintenance outdoors for 1 week, the surface of the cured product did not exhibit any tack for either Sample 4 or Sample 5.

EXAMPLE 3

To 100 parts of silicone-modified polyoxypropylene with an average molecular weight of 6000 and which had the

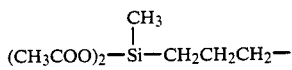

group at 85% of all polyoxypropylene terminals, was added 3, 5, or 7 parts soybean oil as shown in Table 2 and designated as Sample 6, Sample 7, and Sample 8 respectively; to this were added 30 parts dioctyl phthalate, 120 parts higher fatty acid-treated calcium carbonate powder, 30 parts fused silica powder, and 0.1 part dibutyltin diacetate; and this was mixed to homogeneity. The product was relatively thickly coated on a glass plate and then allowed to stand outdoors for 1 week. A comparative example was similarly prepared, but without the addition of soybean oil, which is designated Comparative Sample 2 in Table 2. After standing for 1 week, the surface tack of the samples was inspected by finger touch and the results observed were as reported in Table 2.

TABLE 2

| Sample | Quantity of Soybean Oil (parts) | Surface Tack |
|---|---|---|
| Comparative Sample 2 | 0 | Significant |
| Sample 6 | 3 | Wholly Absent |
| Sample 7 | 5 | Wholly Absent |
| Sample 8 | 7 | Wholly Absent |

EXAMPLE 4

Samples were prepared and tested as described in Example 1, with the exception that one part benzophenone, as sensitizer was added to each composition in Example 1, the compositions were designated Sample 9, Sample 10, and Sample 11 respectively. The results observed were as shown in Table 3. A comparative composition was also prepared as described in Example 1 but the benzophenone was added, and this composition was designated Comparative Sample 3. The results observed were a shown in Table 3.

TABLE 3

| Sample | Quantity of Tung Oil (parts) | Quantity of Benzophenone (parts) | Surface Tack |
|---|---|---|---|
| Comparative Sample 1 | 0 | 0 | Significant |
| Comparative Sample 3 | 0 | 1 | Some |
| Sample 9 | 3 | 1 | Wholly Absent (virtually dry) |
| Sample 10 | 5 | 1 | Wholly Absent (virtually dry) |
| Sample 11 | 7 | 1 | Wholly Absent (virtually dry) |

EXAMPLE 5

Experiments were conducted by the method described in Example 1, with the exception that 1 part benzophenone as sensitizer was added to each sample of Example 3, and the compositions were designated Sample 12, Sample 13, and Sample 14. A comparative composition was prepared as described in Example 3 but one part of benzophenone was added, and this composition was designated Comparative Sample 4. The results observed were as reported in Table 4. Comparative Example 2 is also reported in Table 4.

TABLE 4

| Sample | Quantity of Soybean Oil (parts) | Quantity of Benzophenone (parts) | Surface Tack |
|---|---|---|---|
| Comparative Sample 2 | 0 | 0 | Significant |
| Comparative Sample 4 | 0 | 1 | Some |
| Sample 12 | 3 | 1 | Wholly Absent (virtually dry) |
| Sample 13 | 5 | 1 | Wholly Absent (virtually dry) |
| Sample 14 | 7 | 1 | Wholly Absent (virtually dry) |

Effects of the Invention

Because the room temperature-curable composition of the present invention comprises a silicone-modified polyether blended with ester which is principally composed of an ester of unsaturated higher fatty acid with alcohol, surface tack in the cured material, a significant problem in prior compositions, is very substantially eliminated. Since the absence of tackiness leads to reduced soiling caused by the adhesion of dust, the present composition will be extremely useful as a sealant or hermetic sealing agent for buildings, automobiles, ships, and roads, while also being useful as a coating agent for films, paper, and textiles, as a casting rubber and as a paint.

That which is claimed is:

1. Room temperature-curable composition comprising (A) 100 parts by weight of silicone-modified polyether having at its molecular chain terminals at least one unit of the formula

in which R represents a monovalent hydrocarbon group, X represents a hydrolyzable group and a is an integer with a value of 0 to 2, whose main chain is essentially composed of chemically bonded repeating units of the formula —R'O— in which R' represents a divalent alkylene group and whose molecular weight is from 500 to 15,000 and (B) 0.1 to 50 parts by weight of ester whose principal component is an ester of unsaturated higher fatty acid with alcohol, wherein the fatty acid has at least 10 carbon atoms in the molecule.

2. The room temperature-curable composition according to claim 1 further comprising a sensitizer.

3. The room temperature-curable composition according to claim 1 in which (B) is an ester selected from the group consisting of the condensation product of a higher unsaturated fatty acid selected from the group consisting of oleic, linolenic, eleostearic, licanic, ricinoleic, and arachidonic acids, with an alcohol selected from the group consisting of methanol, ethanol, ethylene glycol propylene glycol, butylene glycol, trimethylolpropane, glycerol, trimethylolethane, pentaerythritol, sorbitol, and organosilicon compounds having Si-bonded organic groups which bear a hydroxyl group, and naturally occurring esters selected from the group consisting of linseed oil, tung oil, soybean oil, dehydrated castor oil, fish oil, hempseed oil, cottonseed oil, castor oil, and tall oil, 4. The room temperature-curable composition according to claim 2 in which (B) is an ester selected from the group consisting of the condensation product of a higher unsaturated fatty acid selected from the group consisting of oleic, linolenic, eleostearic, licanic, ricinoleic, and arachidonic acids, with an alcohol selected from the group consisting of methanol, ethanol, ethylene glycol, propylene glycol, butylene glycol, trimethylolpropane, glycerol, trimethylolethane, pentaerythritol, sorbitol, and organosilicon compounds having Si-bonded organic groups which bear a hydroxyl group, and naturally occurring esters selected from the group consisting of linseed oil, tung oil, soybean oil, dehydrated castor oil, fish oil, hempseed oil, cottonseed oil, castor oil, and tall oil.

5. The room temperature-curable composition according to claim 2 in which the sensitizer is selected from the group consisting of acetophenone, propiophenone, benzophenone, xanthone, fluorenone, benzaldehyde, fluorene, anthraquinone, triphenylamine, carbazole, 3-methylacetophenone, 4-chlorobenzophenone, 4,4'-dimethoxybenzophenone and N,N,N',N'-tetramethyl-4,4'-diaminobenzophenone, and those sensitizers which are the reaction products of organosilane or organopolysiloxane with a sensitizer, 6. The room temperature-curable composition according to claim 4 in which the sensitizer is selected from the group consisting of acetophenone, propiophenone, benzophenone, xanthone, fluorenone, benzaldehyde, fluorene, anthraquinone, triphenylamine, carbazole, 3-methylacetophenone, 4-chlorobenzophenone, 4,4'-dimethoxybenzophenone and N,N,N', N'-tetramethyl-4,4,'-diaminobenzophenone, and those sensitizers which are the reaction products of organosilane or organopolysiloxane with a sensitizer.

* * * * *